US008722166B2

(12) United States Patent
Hopkins

(10) Patent No.: US 8,722,166 B2
(45) Date of Patent: May 13, 2014

(54) EMERGENCY EXTRICATION TAPE

(75) Inventor: John R. Hopkins, Bow Mar, CO (US)

(73) Assignee: Protecto Wrap Company, Denver, CO (US)

( * ) Notice: Subject to any disclaimer, the term of this patent is extended or adjusted under 35 U.S.C. 154(b) by 197 days.

(21) Appl. No.: 13/090,000

(22) Filed: Apr. 19, 2011

(65) Prior Publication Data

US 2011/0253302 A1 Oct. 20, 2011

Related U.S. Application Data

(60) Provisional application No. 61/342,764, filed on Apr. 19, 2010.

(51) Int. Cl.
*B32B 33/00* (2006.01)
*B32B 5/26* (2006.01)
*D03D 25/00* (2006.01)

(52) U.S. Cl.
USPC .......... 428/40.1; 442/181; 442/229; 442/239; 442/246

(58) Field of Classification Search
USPC ........ 428/401, 41.8, 40.1, 343; 442/149, 151, 442/181, 224, 229, 234, 239, 241, 244, 246
See application file for complete search history.

(56) References Cited

U.S. PATENT DOCUMENTS

| 4,230,753 | A  | * | 10/1980 | Sheyon ................... 428/40.6 |
| 4,935,280 | A  | * | 6/1990  | Gangi ..................... 428/102 |
| 6,641,910 | B1 | * | 11/2003 | Bries et al. ............... 428/343 |
| 6,705,054 | B2 | * | 3/2004  | Pelton ....................... 52/203 |
| 8,088,462 | B1 | * | 1/2012  | Cockman et al. ........... 428/40.1 |
| 2003/0057247 | A1 | * | 3/2003 | Farr et al. ................. 225/93 |
| 2010/0143711 | A1 | * | 6/2010 | Daigaku et al. ............ 428/343 |
| 2012/0244770 | A1 | * | 9/2012 | Autterson .................. 442/149 |

FOREIGN PATENT DOCUMENTS

GB 2031755 A * 4/1980

* cited by examiner

*Primary Examiner* — Patricia L Nordmeyer
(74) *Attorney, Agent, or Firm* — Russell T. Manning; Marsh Fischmann & Breyfogle LLP

(57) ABSTRACT

Presented herein is a safety device for use by first responders and search and rescue teams (e.g., rescue personnel). In one arrangement, the device allows for safely extricating occupants from vehicle wreckage. In one arrangement, the safety device may be adhered to glass to permit breaking and removal of such glass without harming the occupants of the vehicle. In another arrangement, the safety device may be utilized to adhere over and cover sharp edges, which may cause injury to rescue personnel and/or victims during removal from a vehicle or other wreckage.

12 Claims, 10 Drawing Sheets

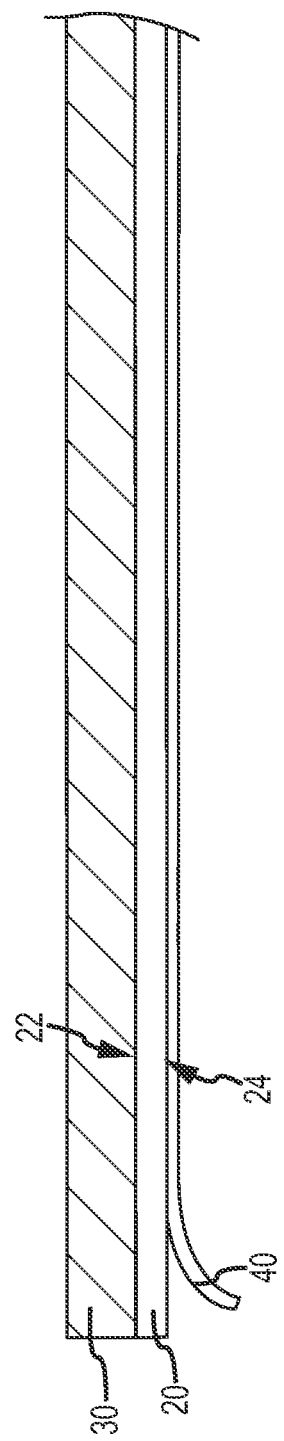

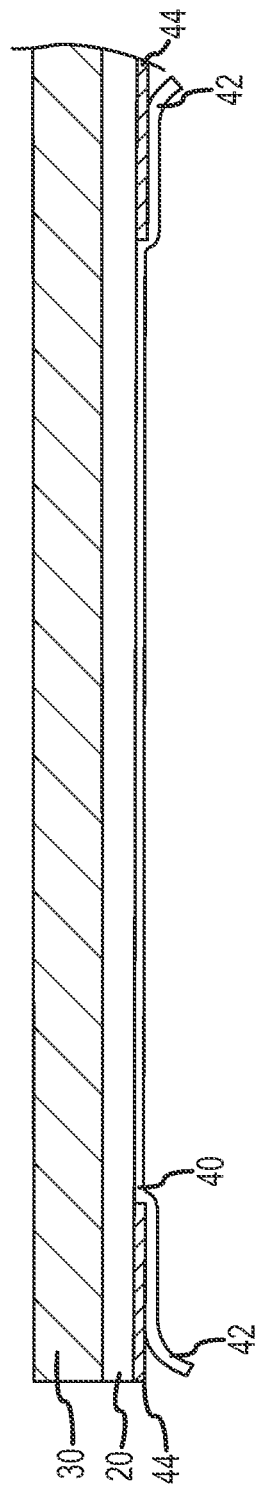

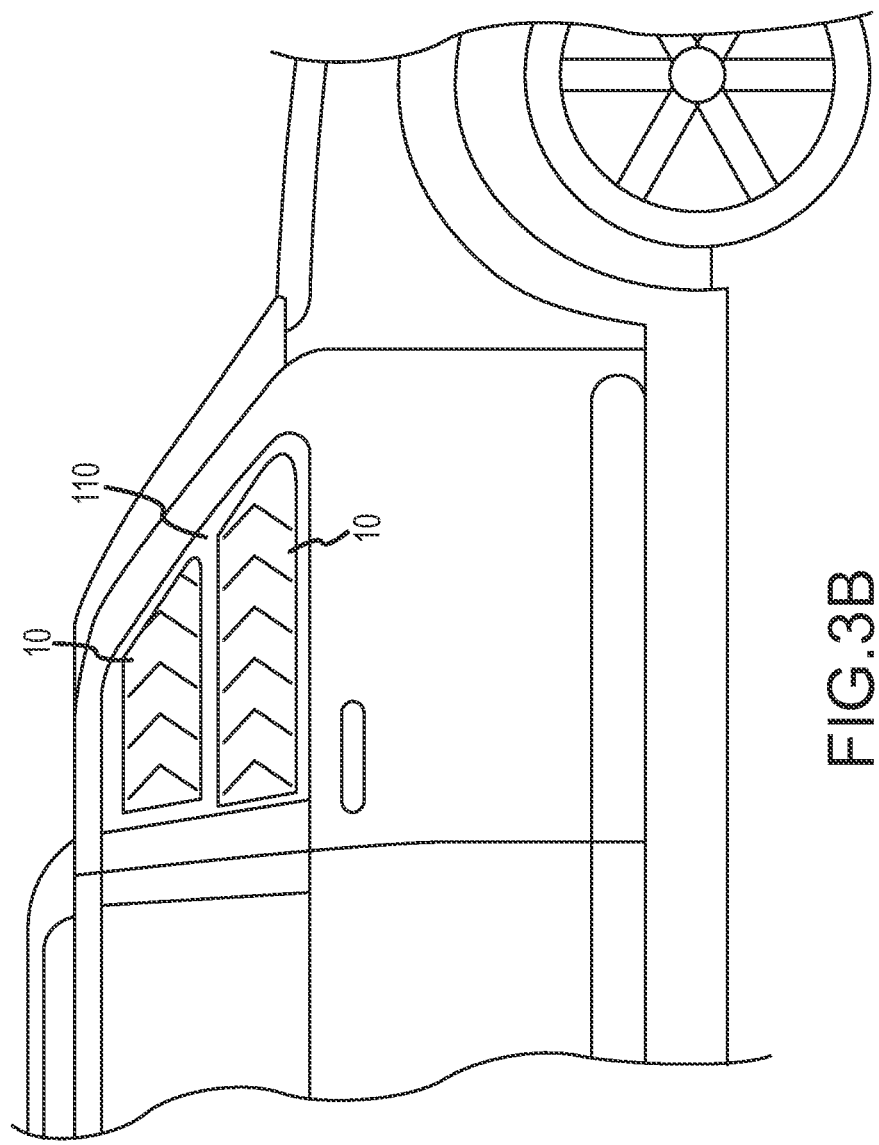

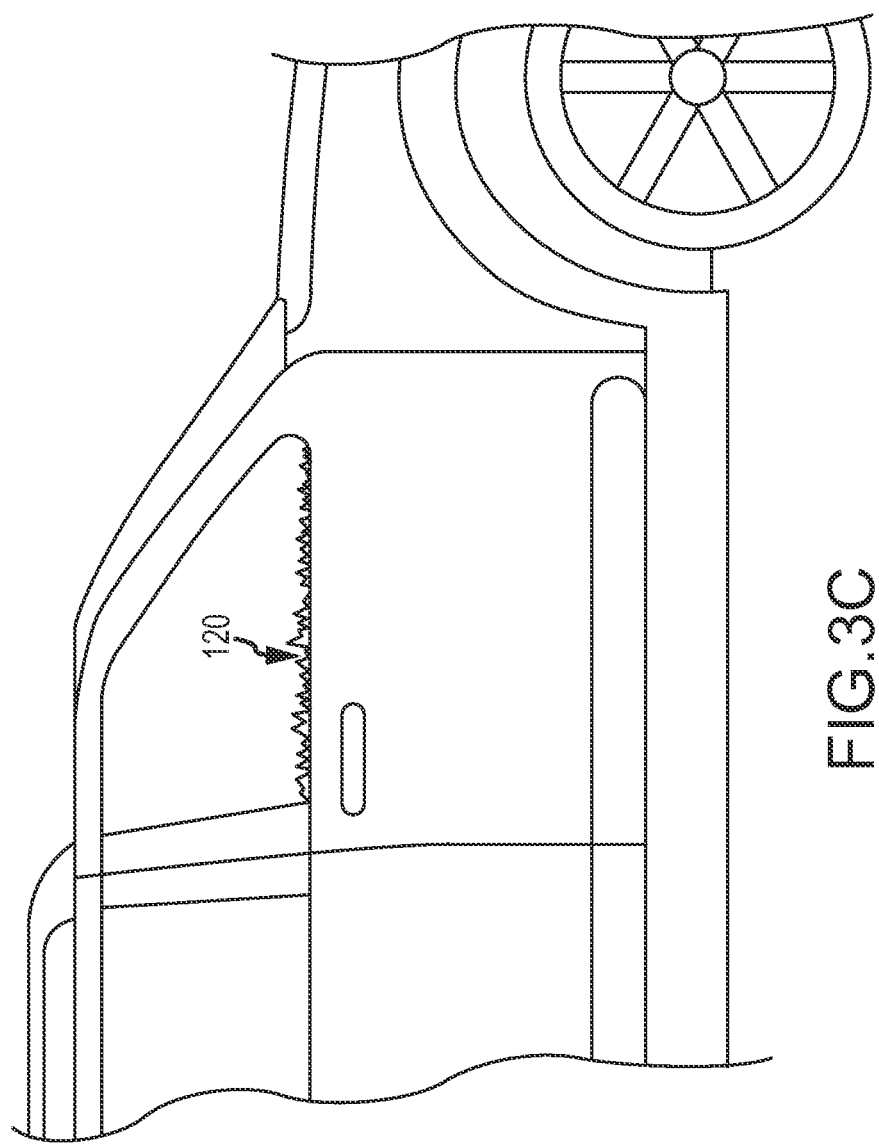

EMERGENCY EXTRICATION TAPE

CROSS REFERENCE

This application claims the benefit of the filing date of U.S. Provisional Application No. 61/342,764 entitled "Emergency Extrication Tape" having a filing date of Apr. 19, 2010, the entire contents of which are incorporated by reference herein.

FIELD

Presented herein is a safety device for use by first responders and search and rescue teams (e.g., rescue personnel). In one arrangement, the device allows for safely extricating occupants from vehicle wreckage. In one arrangement, the safety device may be adhered to glass to permit breaking and removal of such glass without harming the occupants of the vehicle. In another arrangement, the safety device may be utilized to adhere over and cover sharp edges, which may cause injury to rescue personnel and/or victims during removal from a vehicle or other wreckage.

BACKGROUND

Each year, a large number of vehicle accidents occur where one or more occupants of a vehicle is trapped inside the wreckage thereof. In such incidences, rescue/emergency personnel typically have to extricate the occupant from the vehicle.

The way in which an occupant is extricated from a vehicle depends on a number of factors. These factors include the amount of damage to the vehicle and/or the injuries to the occupant. For instance, many accidents result in damage to the body of the vehicle that prevents the opening or removal of the doors of the vehicle. In other instances, the movement of an injured occupant may require the removal of portions of the vehicle from around the occupant to allow for their immobilization prior to removal from the vehicle.

Often, the easiest way to access an occupant is by breaking windows or glass of the vehicle. Accordingly, there are a number of portable glass breaking tools that are used for this purpose. In instances where removal of the windows is not sufficient to provide necessary access to the occupants, rescue techniques may involve use of saws, torches or hydraulically powered shears for cutting away portions of a damaged vehicle such that rescuers gain access to a trapped occupant. One such device is sometimes termed the Jaws-of-Life®. This and similar tools typically utilize a pair of pivotally interconnected jaws that may be forcibly closed by hydraulic, pneumatic or electrical actuators to shear through portions of the vehicle.

While breaking the windows of a vehicle or cutting portions of the vehicle away provides access to the occupants, these actions themselves can result in a safety hazard to the occupants and/or rescue personnel. Specifically, the sharp edges of the broken glass and/or sheared metal may provide a laceration risk to the occupants and/or rescue personnel during an extrication procedure.

SUMMARY OF THE INVENTION

In accordance with the presented inventions, it has been recognized that breaking of glass to remove trapped occupants of a vehicle can result in spraying of glass fragments into the vehicle in addition to the creation of sharp edges that pose a laceration risk. In order to prevent such glass fragmentation, one aspect of the presented inventions is directed to an adhesive extrication tape/strap that may be applied over the surface of a window/glass prior to breaking the same. The adhesive tape allows for breaking the glass and removing the broken glass as a single mass of broken shards typically avoiding glass fragmentation. In another aspect, the extrication tape has a durable backing that allows for the tape to be adhered over sharp or jagged edges of, for example, broken windows and/or shorn metal components to permit movement over such surfaces with reduced laceration concerns.

One difficulty in providing an adhesive extrication device for use in auto accidents is providing desired adhesive qualities in cold and/or wet weather. As will be appreciated, many accidents are caused due to inclement weather conditions. In such arrangements, it may be desirable to remove windows and/or cover sharp edges that are wet and/or at temperatures below freezing. In such conditions, many adhesives do not provide the desired level of adhesion to permit secure adherement to the glass and/or sharp edges and thereby fail to perform their desired function. Accordingly, the inventors have recognized that use of a glue resin with a polymer adhesive additive allows for providing an adhesive tape or strap that provides desired adhesive properties even in wet and cold conditions. Other adhesives that may be utilized include, without limitation, co-block polymers, pressure sensitive adhesives and hot melt adhesives. It will be appreciated that the particular adhesive utilized may vary based on the expected conditions (e.g., geographic locations) in which the extrication tape will be utilized.

The inventors have also recognized that, in order to provide a durable coating for covering, for instance, broken edges of glass and/or shorn metal, the backing of the tape may in various embodiments be a multi-layer and/or a woven material. In the former regard, if a first layer of the backing is punctured a second or third layer may remain non-punctured. In the latter regard, if a weft or warp strand of the weave is cut by an underlying surface, adjacent weft and/or warp strands of the weave are typically not affected and maintain the structural integrity for the remainder of the tape. That is, a small tear or puncture in the tape does not propagate. In one particular arrangement, a three-layer woven material is utilized that provides enhanced tear and puncture resistance. In another arrangement, the backing material may include metal or metallic fibers. For instance, the backing layer may be formed from a wire screen and/or a wire screen interwoven with fabric. Such a metallic backing may provide enhanced wear characteristics for the extrication tape. In any arrangement, the extrication tape may be used to cover sharp edges and provide a durable surface over which, for example a rope may pass. That is, the extrication tape may prevent a rope from becoming snagged or cut by underlying sharp edges. Further, in arrangements that utilize a wire mesh, the wire mesh may allow the tape to better withstand the friction of the rope passing over the tape.

The inventors have further recognized that as emergency service personnel travel to the location of accidents, the amount of supplies that they are able to transport to the scene of such accidents is limited. In this regard, items carried by rescue personnel preferably have multiple uses. Accordingly, in a further aspect, the extrication tape includes directional indicia on the backing such that the tape may be utilized for temporarily directing traffic. For instance, the backing may have arrows or chevrons that allow the extrication tape to be utilized as signage at an accident scene. In a further arrangement, the backing may be a reflective coating (with or without directional indicia) to provide, for example, warning indicators and/or traffic direction in low light situations.

In one arrangement, the extrication tape is provided in a roll having transverse tearing lines at predetermined intervals. Such tearing lines may be formed as perforations (e.g., linearly arranged holes) or other grooves or cuts through, for instance, the adhesive layer and/or the backing layer, that allow for tearing the extrication tape roll at predetermined intervals.

Though discussed primarily in relation to use in extricating occupants form vehicles, it will be appreciated that the extrication tape may be utilized in multiple applications where it is desirable to cover sharp edges to protect accident victims or rescue personnel. For instance, urban search and rescue operations where victims are removed from collapsed buildings (e.g., due to earthquakes etc.) provides one additional non-liming use of the extrication tape.

BRIEF DESCRIPTION OF THE DRAWINGS

For a more complete understanding of the presented inventions and further advantages thereof, reference is now made to the following detailed description taken in conjunction with the drawings in which:

FIG. 2A illustrates a side view of the extrication strip of FIG. 1.

FIG. 2C illustrates a release tab that facilitates removal of the release sheet from the extrication strip.

FIGS. 3A-3D illustrate use of the extrication strip to remove a window from a vehicle.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the inventions to the form disclosed herein. For instance, while the extrication tape disclosed herein is discussed primarily for use in vehicle accident situations, the extrication tape may be utilized in multiple additional applications. Consequently, variations and modifications commensurate with the following teachings, and skill and knowledge of the relevant art, are considered within the scope of the presented inventions.

In automobile accidents, occupants can become trapped within the wreckage of a vehicle. In such instances, emergency/rescue personnel may need to extract the occupant from the vehicle. Rescue personnel typically gain access to a trapped occupant through one of the windows of the vehicle, which often requires breaking one or more windows. This can result in glass fragments scattering into the vehicle. Such scattering of glass fragments can pose a laceration risk to the trapped occupant(s). Further, breaking the windows also typically results in sharp edges of broken glass (e.g., around the window frame) creating a laceration concern to both rescue personnel and the occupant, during removal from the vehicle.

In addition to breaking windows, it is also sometimes necessary to cut away portions of the vehicle to gain access to the trapped occupant. In such arrangements, rescue personnel use devices such as the Jaws-of-Life® to cut and/or spread the structure of the wrecked vehicle. While providing improved access to the occupant, these devices often leave sharp exposed metal edges that again create a safety hazard for both the rescue personnel and the trapped occupant. For instance, rescue personnel may have to move the occupant over the exposed metal edges to remove the occupant from the vehicle.

Provided herein is an accident extrication adhesive covering for application to the surface of windows prior to their breakage/removal and/or for application over sharp edges prior to moving an occupant. Generally, it has been recognized that placing an adhesive covering (e.g., tape) over a window prior to breaking the window significantly reduces or eliminates the fragmentation and scattering of glass fragments. Likewise, it has been recognized that use of a durable backing with an adhesive covering allows such a covering to be applied over sharp edges (e.g., glass or metal) and thereby provides a protective coating that reduces or eliminates laceration concerns.

Figure 1:
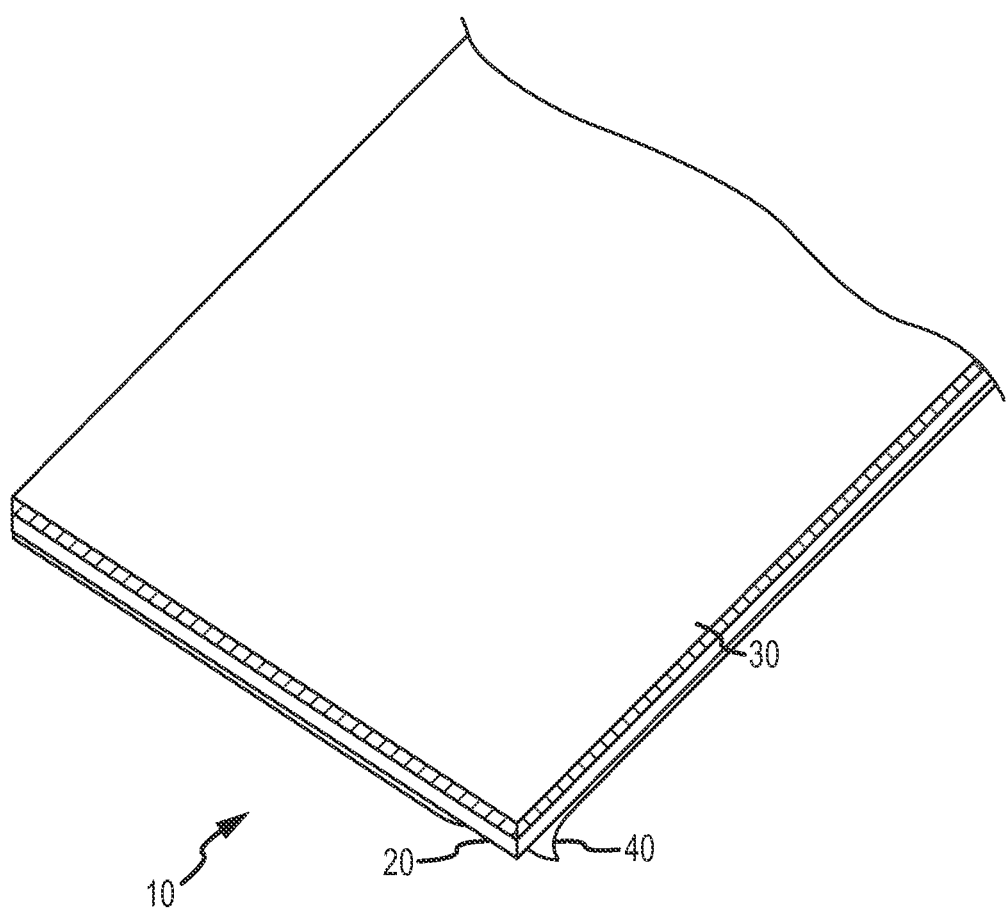
FIG. 1 illustrates a perspective view of an emergency extrication strip.

FIGS. 1 and 2A illustrate perspective and side views, respectively, of one embodiment of an adhesive extrication strip 10 in accordance with certain aspects of the present invention. The extrication strip 10 is adapted for adhesive interconnection to windows or sharp edges (e.g., broken glass, metal edges). In the present embodiment, the adhesive extrication strip 10 includes an adhesive material layer 20 having first and second opposing surfaces. For purposes of the discussion, the opposing surfaces are referred to as the top surface 22 and bottom surface 24. A durable backing layer 30 is attached to the top surface 22 and a removable release sheet 40 covers the bottom surface 24.

The construction of the adhesive layer 20 may be varied. For instance, the adhesive material layer 20 may be fanned from any material that provides the desired level of adhesion. On difficulty in providing such an adhesive covering is the adhesion of such a covering in inclement weather conditions. As will be appreciated, accidents often occur due to slick road conditions caused by rain, snow, ice and/or freezing conditions. Accordingly, the adhesive covering needs to provide desired adhesive properties in wet and cold conditions.

The inventors have attempted to use various different materials for producing an adhesive material layer that has adequate adhesion in wet and/or cold conditions. These materials include bitumen-containing materials such as various tar adhesives and rubberized asphalts, as well as natural and/or synthetic rubber (e.g., butyl-rubber) and butyl-rubber compounds. However, while such materials are known for use in adhesive waterproofing membranes (e.g., roofing underlayments, etc.) and provide good adhesion in favorable weather conditions (e.g., warm and dry), it has been determined that these materials often fail to provide sufficient adhesion in wet conditions and/or or low temperature conditions (e.g., below freezing). In one embodiment, the extrication strip utilizes a glue resin with a polymer additive. Other adhesives may be utilized including, without limitation, pressure sensitive adhesives, co-block polymers and/or hot melt adhesives. Preferably, the chosen adhesive will provide good adhesion to wet surfaces (e.g., glass, metal, etc) and provide adhesion over a large temperature range. Such a temperature range may be from about freezing to about 120 degrees F. In a further arrangement, such a temperature range may be from about 0 degrees F. to about 120 degrees F.

The adhesive material layer will typically have a thickness between about 10 mils and about 60 mils. Additionally, the adhesive material layer 20 may itself be a multilayered structure. For instance, the adhesive material layer 20 may be constructed having one or more reinforcing layers (e.g., internal mesh layers).

Attaching the adhesive extrication strip 10 to a surface requires removing a release sheet 40 on the bottom surface 24 of the adhesive material layer 20 to expose the adhesive layer. That is, removing the release sheet(s) 40 exposes the bottom surface 24 of the adhesive material layer, which may be contacted with (i.e., adhered to) a surface. Many different foils, films, papers or other sheet materials are suitable for use in constructing the release sheet 40. For example, the release sheet 40 may be formed from metals, plastics, or papers treated with silicon or other substances to provide a low level of adhesion to the underlying adhesive associated with the adhesive material layer 20. In any case, it is desirable that the release sheet 40 be easily removed from the adhesive sheet 20.

Further complicating the removal of the release sheet form the backing layer is the fact that in many emergency response situations, the rescue personnel wear protective gloves. In this regard, the ability to grasp the release sheet and peel it away from the bottom surface of the release layer is compromised. To facilitate removal, in one arrangement, the extrication strip 10 incorporates one or more release tabs. See FIG. 2C. As illustrated, FIG. 2C shows an end view of end of the extrication strip where the lateral of the release sheet form release tabs 42. That is, unlike the central portion of the release sheet which is releaseably adhered to the bottom surface of the adhesive layer 20, these tab portion are not adhered to the bottom surface of the adhesive layer. Rather, these tabs 42 overlay bottom surface of a spacer strip 44 that is adhered along the lateral edges of the bottom surface of the adhesive layer. A lower edge of these spacer strips is non-adhesive. In this regard, once the extrication strip is unrolled, the tab portions 42 readily separate from the bottom surface of the strip. Accordingly, a user may grasp the lateral edge of the extrication strip as defined by the width of the spacer 44 and the opposing top surface of the backing layer 30 in one hand and grasp the tab portion 42 of the release sheet in the other hand and thereby pull the release sheet away from the bottom surface of the extrication strip 10. Though illustrated with a tab on both lateral edges, it will be appreciated that such a tab may be provided along a single edge in other embodiments. What is important is that a bottom portion of the adhesive layer is covered across a portion of its width by a material that has a non-adhesive bottom surface that the release sheet overlays and thereby defines a tab that a user may grasp while also grasping the extrication strip. Preferably, the width of the tab is an inch or more such that users may readily grasp the tab with gloved hands. Generally, the material that is adhered to the edge of the adhesive layer is permanently bonded thereto, however this is not a requirement.

To enhance its durability, one embodiment of the adhesive extrication strip 10 includes a backing layer 30 that covers the top surface 22 of the adhesive material layer 20. The backing layer material 30 may be formed in a sheet and may be applied to an exposed surface of the adhesive material layer 20 thereby adhering the backing layer to that surface. Such application may be performed utilizing compressive rollers in a manner similar to that disclosed in U.S. Pat. No. 6,676,779 entitled "Air and moisture barrier laminate apparatus" the entire contents of which are incorporated herein by reference.

The backing layer 30 may be any material that forms a durable surface. However, for applications over sharp edges, is may be desirable that the backing layer be multi-layered and/or a woven material. In this regard, if an underlying sharp edge cuts one or more warp or weft yarns strands of the woven material, adjacent strands are likely to be undamaged and maintain the structural integrity of the strip. That is, use of a woven material may prevent the propagation of tears through the strip. The same is true for multi-layered backings. To provide further strength, the present embodiment utilizes a three layer woven fabric that is puncture and tear resistant. In one embodiment, the thickness of the backing layer is at least about 10 mils and in a further embodiment is more than about 20 mils. The backing layer may be formed from various natural and/or synthetic materials.

Figure 2B:
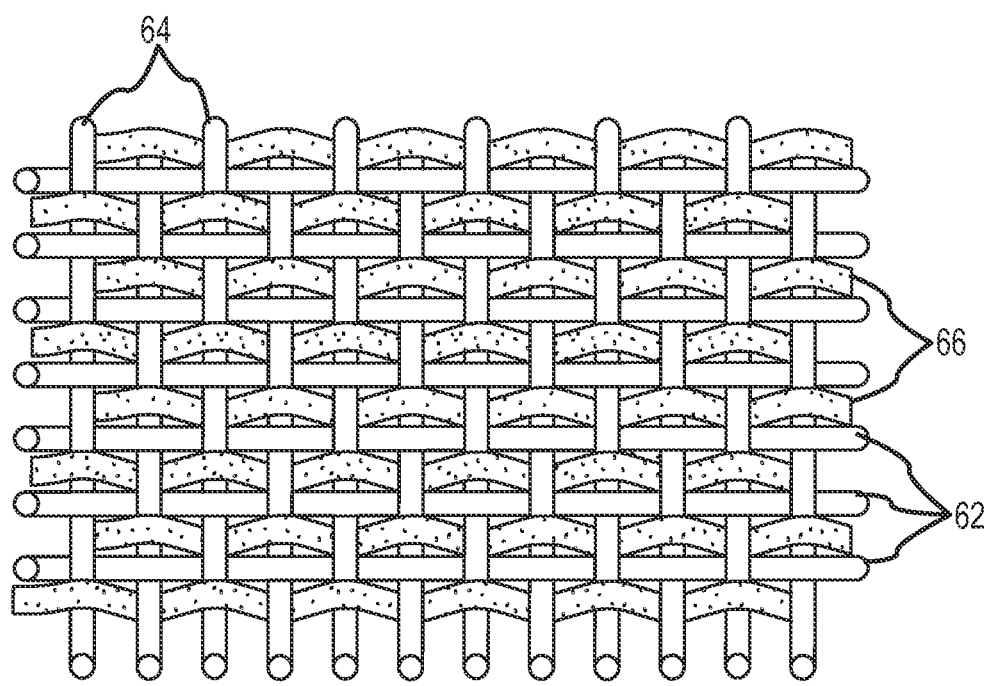
FIG. 2B illustrates a metallic screen backing layer that may be utilized with various embodiments of the extrication strip.
Figure 3A:
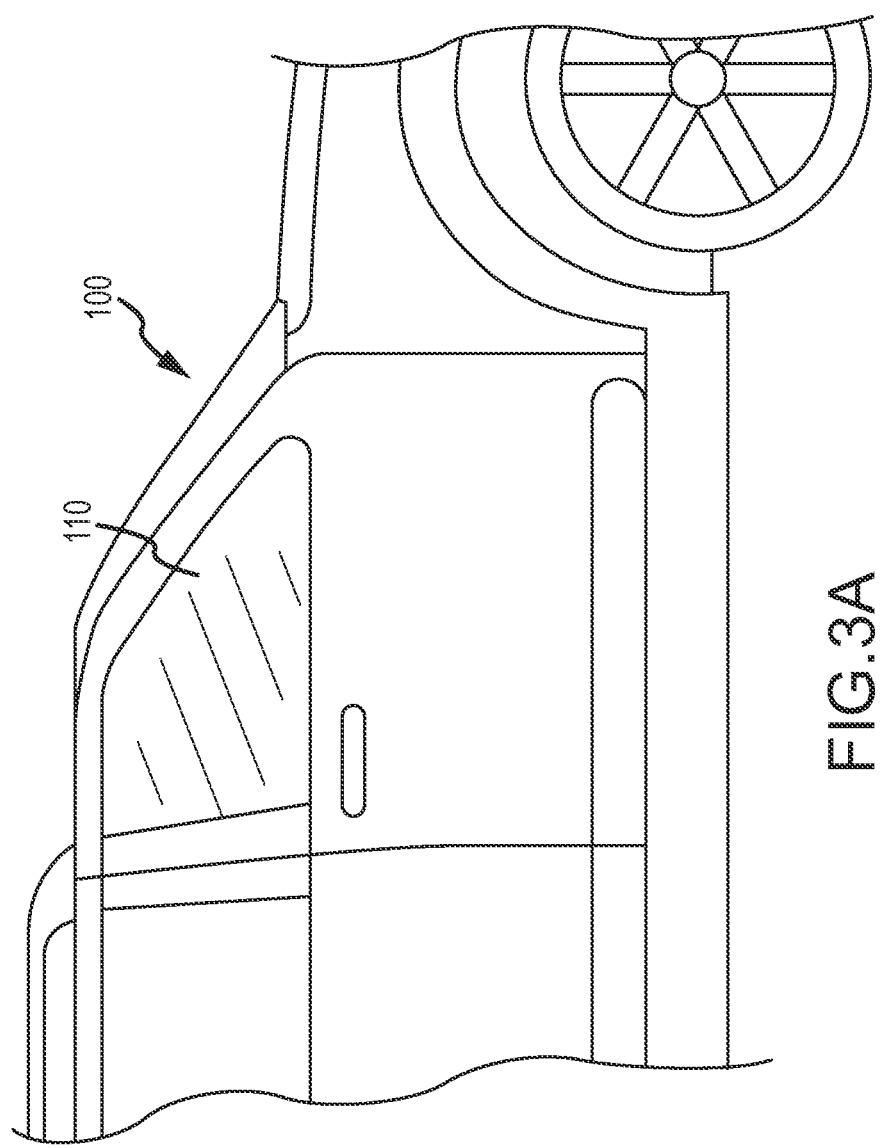
Figure 3D:
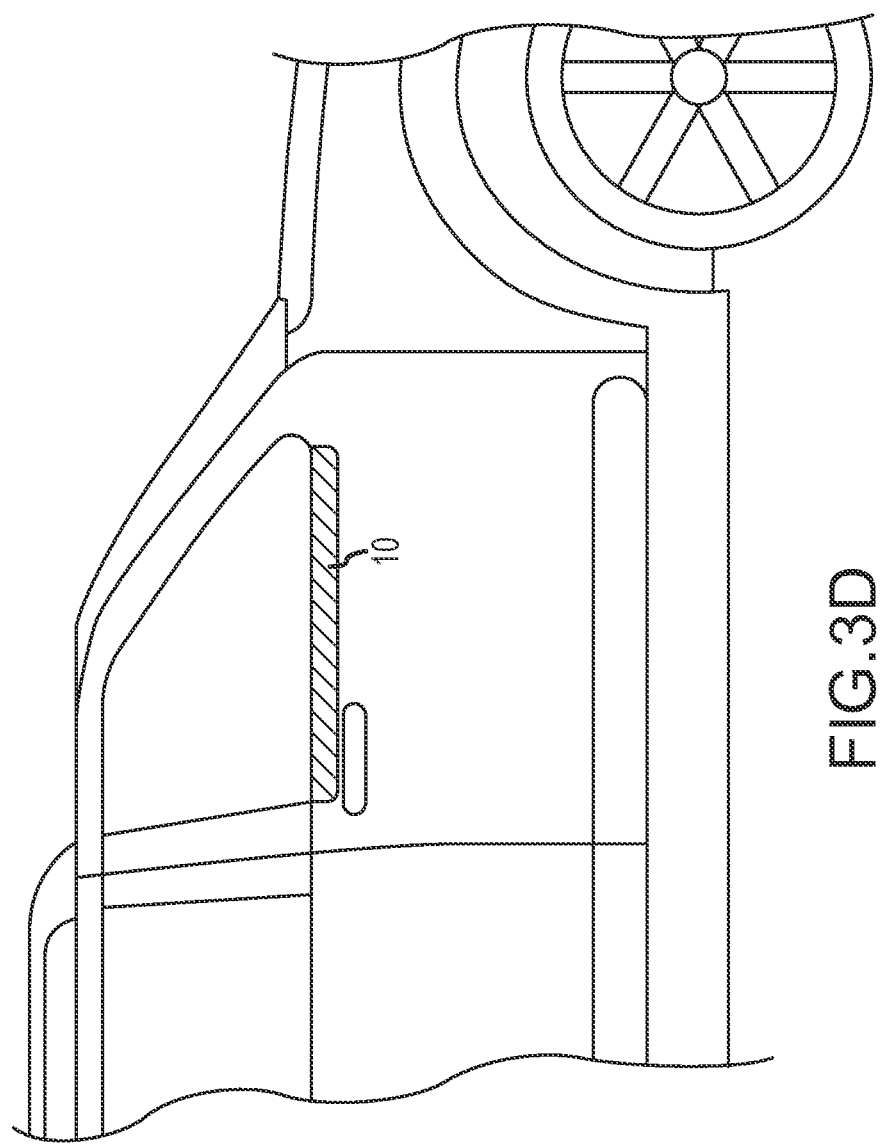

In a further embodiment, the backing layer uses a composite weave 60 to provide improved wear characteristics to the strip. As illustrated in FIG. 2B, the composite weave is formed of a mesh weave having metal wires extending in both the warp and weft directions. The gauge and spacing of the wires may be selected to provide desired characteristics. Disposed between the weft wires 62 is a textile fabric 66. That is, textile fabric is interwoven with the wires 62, 64. In this regard, the resulting structure may have textile strands of yarns disposed between each row of weft and/or warp wires. This allows the weave 60 to provide both a bonding surface for the adhesive material layer 20. It will be further appreciated that various different fabrics may be utilized to produce such a composite weave. A non-limiting list of such fabrics includes nylon, polypropylene and cotton. In further embodiments, the backing layer may be made of a metal screen without the interwoven fabric.

Use of the metallic screen backing provides a very wear resistant backing for the extrication strip. Such a wear resistant backing may be desirable in rescue situations where a rope passes over a surface. That is, the extrication strip may be adhered over the surface to provide a protective surface for the rope. The metal baking layer may prevent the rope from wearing through the strip.

FIGS. 3A-3D illustrate a process for using the extrication strip 10 to remove a window from a vehicle 100. Initially, one or more sections of the extrication strip 10 are applied to the surface of the window 110. See FIG. 3B. The application of the strip 10 to the window 110 may require utilization of multiple strips and/or cutting the strips to match the periphery of the window. To minimize the amount of glass fragmentation, it may be desirable to cover as much of the window as possible with the extrication strip(s) 10.

Once the extrication strip 10 is applied to the window 110, the window 110 may be broken. Numerous tools are available for the breaking of auto glass and are commonly utilized by rescue personnel. Once the window is broken, it may be removed from the vehicle 100. See FIG. 3C. While removing a majority of the window and/or minimizing the scattering of glass fragments into the passenger cabin of the vehicle (i.e., the glass fragments remain adhered to the extrication strip), the removal of the window often leaves a jagged edge 120 at least along the bottom edge of the window. This jagged edge 120 of broken glass provides a laceration hazard to rescue personnel as well as any occupant removed through the broken window. Accordingly, an additional strip of the extrication strip 10 may be utilized to cover the jagged edge. See FIG. 3D. In this regard, the exposed bottom surface of the strip 10 may be adhered to, for example, an outside surface of the door and an inside surface of the door, such that the body of the strip 10 overlays the jagged edge and thereby provides a safety barrier between the jagged edge and rescue personnel/occupants. Accordingly, rescue personnel may remove the occupant from the vehicle with reduced concerns to their own safety as well as the safety of the occupant. Though discussed in relation to removal of an occupant through a window, it will be appreciated that the extrication strip 10 may be utilized to cover any sharp edges that are present in the wreckage of the vehicle. Specifically, it is common practice to cut away the pillars of the vehicle that extend between the passenger doors and/or between the passenger doors and the roof of the vehicle. IN this regard, the roof of the vehicle may be removed by shearing through the support pillars. This process results in the formation of sharp metallic edges. Accordingly, the extrication strip may be applied over these edges, in a manner similar to its application over the shard glass edges illustrated in FIG. 3C, to provide a protective barrier.

Figure 4:
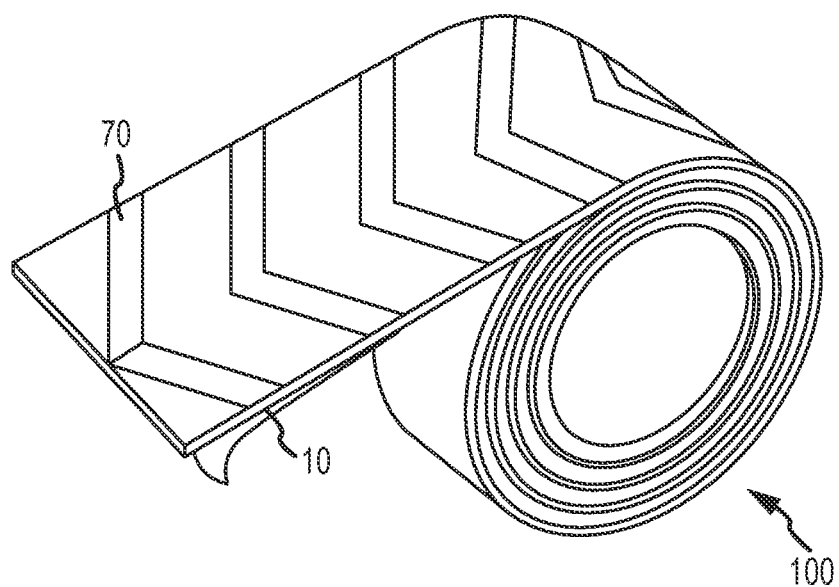
FIG. 4 illustrates a roll of the extrication strip.
Figure 5A:
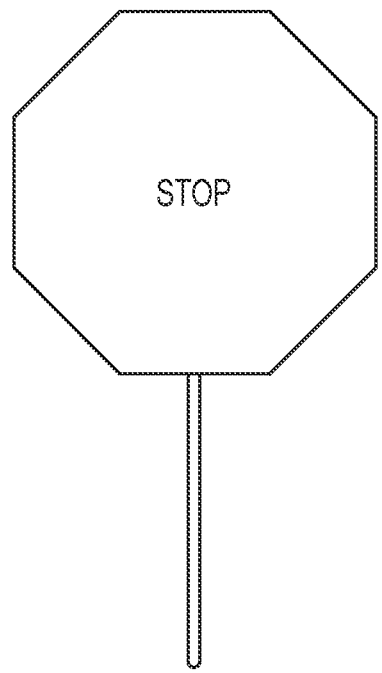
FIGS. 5A and 5B illustrate use of the extrication strip as a warning and/or traffic directing device.
Figure 5B:
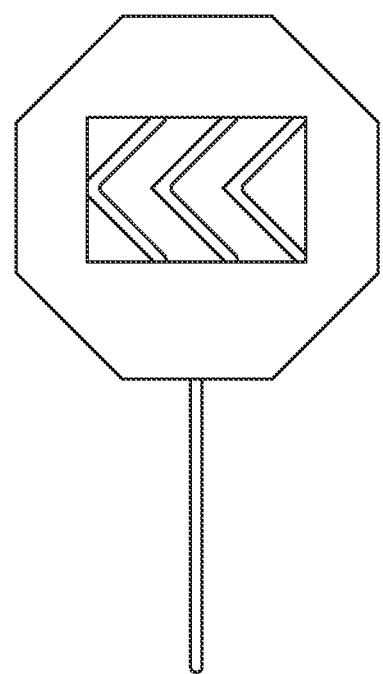

It will be appreciated that, in many rescue situations, rescue personnel must transport all their materials to the site of an accident. Accordingly, the ability to utilize a single rescue device for multiple purposes is desirable. In the present embodiment, the extrication strip 10 is provided with a reflective backing that allows utilizing the extrication not only for extracting occupants from the wreckage of a vehicle but also as, for example, a warning device for other motorists. In this regard, the extrication tape may be adhered to various objects to provide reflectors about an accident scene. In a further arrangement, as illustrated in FIGS. 4, 5A and 5B, the extrication strip may be formed with a plurality of arrows 70 on the exposed surface of the backing layer 30. That is, the outer surface of the backing layer may include surface indicia for directing traffic. These arrows 70 or chevrons and/or the entire backing surface may be reflective and allow using the strip to, for example, direct traffic in low light conditions.

As illustrated in FIG. 4, the extrication strip may be provided as a roll 100 that may be conveniently carried and stored by emergency personnel. It will be appreciated that desired lengths of this roll may be cut and applied to various surfaces. In addition, the roll may have preformed tearing lines at various intervals. In such an arrangement, the backing layer may be cut at predetermined intervals and/or the adhesive membrane may be perforated to allow for emergency personnel to conveniently tear a predetermined length of the extrication tape from the roll.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. An adhesive extrication tape for adhering to a window such that the window can be broken and removed while adhered to the tape or for adhering over a sharp surface that provides a laceration hazard, comprising:

an adhesive layer, wherein the adhesive layer retains adhesive qualities in wet conditions and/or at temperatures below freezing, the adhesive layer having a top surface and a bottom surface;

a backing layer having at least three layers of woven material, wherein a bottom surface of the backing layer is continuously bonded to the top surface of the adhesive material layer, and wherein the top surface of the backing layer comprises a pattern of directional indicia;

a release liner covering at least a portion of the bottom surface of the adhesive material layer, wherein the release liner is releasably attached to the bottom surface and wherein removing the release liner exposes the bottom surface of the adhesive layer;

wherein, the backing layer, adhesive layer and release liner, defining the extrication tape are wound into a roll, whereby an outermost end of the extrication tape can be unwound and removed to form a tape segment.

2. The extrication tape of claim 1, wherein the directional indicia comprises a chevron pattern.

3. The extrication tape of claim 1, further comprising:
light reflective material that is one of incorporated into and disposed on the top surface of the backing layer.

4. The extrication tape of claim 1, wherein the extrication tape is formed with multiple transverse tearing lines disposed at predetermined intervals.

5. The extrication tape of claim 4, wherein each tearing line is composed of a cut line extending through the backing layer, wherein the cut line does not extend through the adhesive layer.

6. The extrication tape of claim 4, wherein each tearing line is a perforated line composed of linearly arranged apertures.

7. The extrication tape of claim 1, wherein the woven material further comprises:
metal fibers in at least one of weft and warp directions of the woven material, wherein the metal fibers are interwoven with non-metallic fibers.

8. The extrication tape of claim 1, wherein the adhesive layer comprises an adhesive resin and a polymer additive.

9. The extrication tape of claim 1, further comprising:
a spacer strip interconnect to a lateral edge of the bottom surface of the adhesive layer, wherein a bottom surface of the spacer strip is non-adhesive and wherein the release sheet overlay the non-adhesive bottom surface of the spacer strip to define a release tab.

10. The extrication tape of claim 1, wherein the extrication tape has a puncture resistance of at least 2000 psi as measured by an ASTM D412 test method.

11. The extrication tape of claim 1, wherein the extrication tape has a tensile strength of at least 60 psi as measured by an ASTM D412 test method.

12. The extrication tape of claim 1, wherein a thickness of the tape is less than 35 mils.

* * * * *